UNITED STATES PATENT OFFICE.

JEAN ALTWEGG, OF LYON, FRANCE, ASSIGNOR TO SOCIETE CHIMIQUE DES USINES DU RHONE, (ANCIENNEMENT GILLIARD, P. MONNET ET CARTIER,) OF PARIS, FRANCE.

PROCESS FOR THE PREPARATION OF THE DI-ALKYL-AMINO-ETHYL DERIVATIVES OF THEOBROMINE.

1,414,333.      Specification of Letters Patent.      Patented May 2, 1922.

No Drawing.   Application filed June 29, 1920.   Serial No. 392,655.

*To all whom it may concern:*

Be it known that I, JEAN ALTWEGG, of 227$^{bis}$ Avenue de Saxe, Lyon, France, a citizen of the Confederation of Switzerland, have invented certain new and useful Improvements in a Process for the Preparation of the Di-alkyl-amino-ethyl Derivatives of Theobromine, of which the following is a specification.

Theobromine, therapeutically very valuable by its diuretic qualities, has the disadvantage of being almost insoluble in water. Hence it is only slowly absorbed and is not suitable for use in solution; it is also not adapted for use for injections.

In order to overcome this difficulty, theobromine has long ago been replaced by soluble derivatives and for this purpose the most different procedures have been adopted. The results obtained have however never turned out to be entirely satisfactory.

Among other things it has been proposed to sulphonate theobromine and to inject it in the form of a soluble alkali-sulphonate. It has been found however that the introduction of the sulpho-group into theobromine destroys its therapeutic qualities.

It has also been proposed to use the soluble double salts of theobromine and of sodium with organic acids. The salts thus obtained possess at all events the therapeutic qualities of theobromine, but they have also a great disadvantage; their aqueous solutions are strongly alkaline and caustic, they excite the mucous membrane, and injections with these substances are painful.

According to the present invention this disadvantage can be avoided. The invention relates to a process for the preparation of di-alkyl-amino-ethyl-theobromine, substances retaining the diuretic qualities of the theobromine. They are strong bases the salts of which with mineral acids give a completely neutral re-action and exert no irritation upon tissue.

These substances correspond to the general formula:

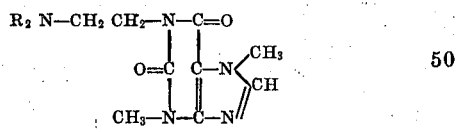

in which R represents an alkyl radical.

The new derivatives of theobromine are obtained by the action of chlorethyl-di-alkyl-amine upon metal salts of theobromine. The process is carried out with advantage in a neutral organic solvent. The temperature may vary within tolerably wide limits.

*Example.*

15 parts of chloro-ethyl-di-ethyl-amine are dissolved in benzene, 20 parts of theobromine-sodium are suspended in this solution which is then heated at boiling temperature for several hours. After cooling, the benzene solution is filtered off from the sodium chloride formed and is evaporated. A crystalline mass remains which is recrystalized from petroleum ether. Thus the di-ethyl-amino-ethyl-theobromine is obtained which melts at 67° C.

It is fairly soluble in water and the aqueous solution has a strongly alkaline reaction. The substance is dissolved easily in most organic solvents, but with more difficulty in ether and petroleum ether.

For the preparation of the hydrochloride of di-ethyl-amino-ethyl-theobromine the base is dissolved in the theoretic amount of hydrochloric acid and is evaporated to dryness.

The hydrochloride can be recrystallized from alcohol and thus be obtained in fine colourless crystals which melt at 202° C. It is very soluble in water; and the aqueous solution has a completely neutral reaction. The hydrochloride is easily soluble in alcohol, acetone, chloroform, less easily in benzene, ethyl acetate and petroleum ether.

What I claim and desire to secure by Letters Patent is:—

1. As an article of manufacture, the derivatives of theobromine having the formula:

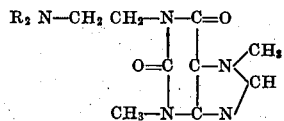

in which R represents an alkyl radical.

2. A new derivative of theobromine, diethylamino-ethyl theobromine, melting at 67° C., fairly soluble in water, forming aqueous solutions having a strongly alkaline reaction, soluble in most organic solvents, less soluble in ether and petroleum ether.

In testimony whereof I have signed my name to this specification.

JEAN ALTWEGG.

In presence of—
JULIAN KEMBLE SMEDBERG.